2,696,677

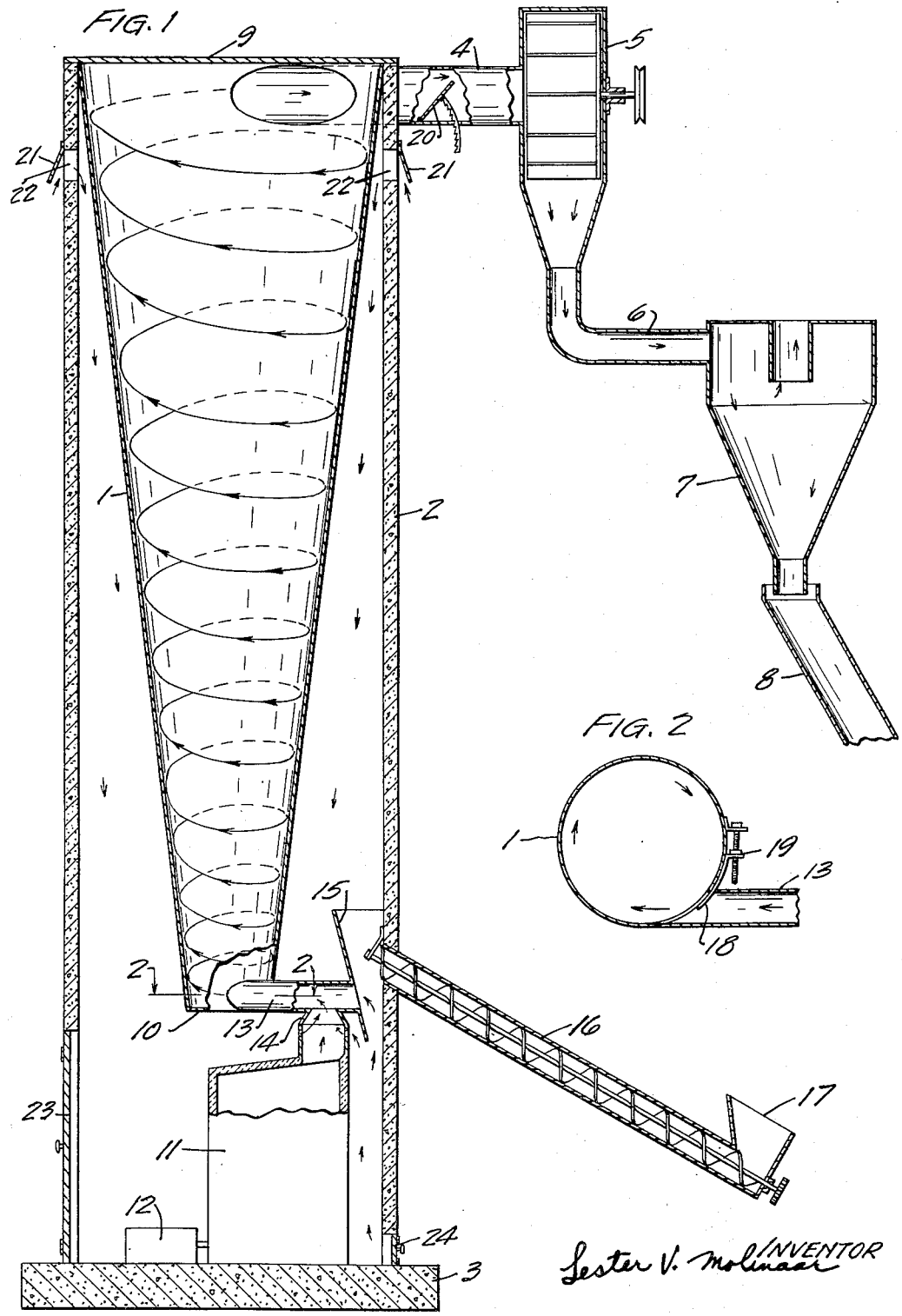

DEHYDRATOR

Lester V. Molenaar, Lake Lillian, Minn.

Application January 14, 1952, Serial No. 266,362

7 Claims. (Cl. 34—57)

This invention relates to dehydrators and more particularly to alfalfa dehydrators.

In the conventional drum type alfalfa dehydrators, there are several objectional features. These dehydrators require large costly rotating mechanical parts. During a considerable part of the time the alfalfa is in the rotating drum it is lying on the bottom, or on one of the flanges secured to the sides of the drum and is not during that time in intimate contact with the dehydrating heated air and combustion gases.

It is an object of this invention to provide a dehydrator in which the alfalfa is in intimate contact with the dehydrating heated air and combustion gases during the entire time it is in the dehydrator, thus reducing the time required for dehydrating to a minimum.

In conventional dehydrators the leaves are dried more than the stems. This destroys a large portion of the carotene, since the leaves contain about twelve times as much carotene as the stems. Destruction of the carotene is an oxidation process. It is an object to provide a dehydrator in which the stems and coarse parts of the alfalfa are dried to a greater extent than the leaves and fine parts, thereby preserving the greatest possible amount of carotene.

Another object is to provide a dehydrator which requires a minimum of rotating parts, and a minimum of costly construction, and a minimum of power requirements.

These and other objects will become apparent by reference to the following description and drawings in which:

Fig. 1 is a vertical cross-sectional view of my dehydrator, and

Fig. 2 is a cross section of Fig. 1 along the line 2—2.

Referring to Fig. 1, the dehydrating chamber 1 is in the shape of a frustrum of a cone. Said dehydrating chamber 1 with its large circumference upwards, is supported by suspension within a cylinder 2, which may be a concrete stave silo. Cylinder 2 is in turn supported by a foundation 3. A duct 4 is connected to the upper part of the dehydrating chamber 1 tangent to the surface of said dehydrating chamber 1. Duct 4 is for the purpose of conducting the dried alfalfa and the exhaust air and combustion gases to the suction side of blower 5. Within said duct 4 is a damper 20, for the purpose of regulating the amount of vacuum within the dehydrating chamber 1. Blower 5 is for the purpose of drawing the alfalfa and the heated air and combustion gases through the dehydrating chamber 1, and then forcing said alfalfa and the exhaust air and combustion gases through duct 6 to a dust collector 7. A pipe 8 is provided to conduct the dried alfalfa to a place of storage or to a mill for further processing.

Fig. 2 is a cross sectional view along line 2—2 of Fig. 1. Duct 13 is connected tangent to the inner surface of the lower portion of dehydrating chamber 1, producing a rotation of the air and alfalfa in said cone. Sliding gate 18 is provided to control the size of the opening where duct 13 is connected to the dehydrating chamber 1. Lock bolt 19 is provided to keep the sliding gate in proper adjustment.

Referring again to Fig. 1, duct 13 is connected to a funnel shaped element 14, said funnel shaped element being located directly over furnace combustion chamber 11. Duct 13 is also connected to a hopper shaped element 15 to receive the finely chopped wet alfalfa. A conventional burner 12, and its combustion chamber 11, are provided to supply heat energy for use in the dehydrating process, said heat energy being in the form of a mixture of highly heated air and combustion gases. Fuel used in burner 12 can be oil, natural gas, butane, or other adaptable fuels. The burner 12 has conventional controls, not shown, which controls include a thermostat located in duct 13. An auger 16 is provided for the purpose of conveying fresh, wet alfalfa from hopper 17 into hopper shaped element 15. The rate at which finely chopped wet alfalfa is added to hopper 17 is conventionally controlled by a thermostat, not shown, located in duct 4. The lower end of hopper shaped element 15 is open to allow undesirable material, such as small stones, sticks or pieces of metal to fall through, while the lighter finely chopped alfalfa is caught in the air stream and enters duct 13. A clean out door 24 is provided to allow easy removal of said undesirable material. Openings 22 are provided to allow air to enter cylinder 2, and there are provided shields 21 over said openings to prevent rain from entering. A door 23 is provided for the purpose of entering the cylinder 2 in order to service the burner 12, or inspect the dehydrator. There is provided a tight fitting cover 9 over the dehydrating chamber 1. A bottom 10 is also provided for the dehydrating chamber 1.

In operation blower 5 is first started, being powered by conventional means. This causes a movement of air in the following described manner: Fresh air enters openings 22. The air passes down between the dehydrating chamber 1 and the walls of cylinder 2, thence into duct 13 through hopper shaped element 15, by passing through the openings between funnel shaped element 14 and the combustion chamber 11, and when the oil burner 12 is in operation by passing through the oil burner 12 and combustion chamber 11 and funnel shaped element 14. From duct 13 the air enters the dehydrating chamber 1 at a rate determined by the setting of the slide gate 18 and the damper 20. The air, upon entering the dehydrating chamber 1, strikes the wall of dehydrating chamber 1 and starts a rotating spiral upward movement. Upon reaching the top of the dehydrating chamber 1 the air enters duct 4, passes through said duct 4 into blower 5. From the blower 5 the air passes through the duct 6 to the conventional type dust collector 7, and from there into the open air.

After starting the blower 5 in the aforementioned manner, the burner 12 is started and simultaneously auger 16 is started and finely chopped wet alfalfa is added to hopper 17. Auger 16 is powered by conventional means. Finely chopped wet alfalfa is added at a rate determined by the exhaust temperature. Should the exhaust temperature rise above a predetermined value the rate at which alfalfa is added is increased. Auger 16 conveys the finely chopped wet alfalfa to hopper shaped element 15. In element 15 the alfalfa is caught in the air stream and enters duct 13. The highly heated air and combustion gases now enter duct 13 from combustion chamber 11. The said heated air and combustion gases mix with the finely chopped wet alfalfa in duct 13 and enter the dehydrating chamber 1. The mixture of heated air, hot combustion gases and wet alfalfa strike the wall of the dehydrating chamber and start a rapid spiral upward motion. Simultaneously the moisture in the wet alfalfa is heated by the heated air and combustion gases and is changed to a vapor state. The wet alfalfa in its spiral movement upwards, soon reaches a point where the upward thrust of the highly heated air and combustion gases on the wet alfalfa, and the downward thrust of gravity just balance. This is due to the increasing diameter of the dehydrating chamber which thus slows the upward motion of the heated air and combustion gases. As the alfalfa gives up its moisture to the heated air it becomes lighter and can be supported on a slower air stream, so it again rises. This process continues until the alfalfa has reached a desired dryness when it has reached the top of the dehydrating chamber where it leaves along with the exhaust air, combustion gases, and water vapor and passes in turn through duct 4, blower 5, and duct 6, then into the dust collector 7 where the alfalfa is separated from the exhaust air, combustion gases and water vapor. The alfalfa now passes through pipe 8 to a place of storage or to a mill for further processing, while the exhaust air, combustion gases and water vapor pass through the top of the dust collector 7 into the open air.

It is to be noted that the leafy parts of the alfalfa plant are lighter than the stem parts so that the leafy parts are removed from the dehydrator more rapidly than the stem parts. The leafy parts of the alfalfa plant will thus have a higher moisture content than the stem parts. It is well known that the leafy part of the alfalfa plant contain the most carotene, and are thus subject to damage more easily than the stem parts. By drying the stems more than the leaves this invention gives a product of desired moisture content with the highest possible carotene content.

The fresh air which enters the cylinder 2 and passes between the dehydrating chamber and said cylinder 2 picked up the heat which passes through the walls of the dehydrating chamber 1. This air is then used in the dehydrating process. Heat loss from the dehydrating chamber is thus kept at a minimum without the necessity of expensive insulation.

It is obvious that this invention may take widely different forms from those illustrated, and it is to be limited in scope only as defined in the following claims. The expression "frustum of a cone" has been used in the specification and claims, such form being regarded as optimum for my dehydrating chamber 1. Experiments with elliptical cones proved satisfactory and it will be understood that this expression will be interpreted to include such forms. While a vertically mounted cone is regarded as best, my invention will operate satisfactorily if said cone is placed at an angle to the vertical. While my invention has been described as a chopped alfalfa dehydrator it is obvious that it may be used for dehydrating other substances such as finely chopped fruits and vegetables for example.

What I claim is:

1. In a drier for a wet chopped substance, a dehydrating chamber comprising the frustum of a cone, a vertical cylinder, means for attaching the large circumference end of said frustum in the upper portion of said cylinder, a lower duct connected tangent to the circumference of the lower inner surface of said frustum, an upper duct connected tangent to the circumference of the inner surface of said upper end of said frustum, said upper duct being connected in the opposite direction from said lower duct, a source of heated air connected to said lower duct, a dust collector, a blower connected between said upper duct and said collector, for drawing said heated air from said source through said lower duct, said frustum, said upper duct, and forcing said air into said dust collector, and means for introducing said wet chopped substance into said heated air at said lower duct.

2. Apparatus according to claim 1, wherein a damper is connected in said upper duct to control the amount of vacuum produced in said dehydrating chamber by said blower.

3. Apparatus according to claim 1, wherein a trap is connected to said lower duct to collect heavy unwanted material from said substance.

4. A cyclonic drier for drying particles comprising: a drying chamber in the shape of a frustum of a cone, a silo, an opening in the upper part of said silo, means for suspending said frustum in said silo, large circumference up, and inlet tangent to the lower circumference of said frustum, an outlet tangent to the upper circumference of said frustum, means for producing a gas current through said opening past the outside of said frustum, into said inlet, helically through said frustum, out said outlet, and means for entraining particles of alfalfa on said gas current.

5. A cyclonic drier for drying particles comprising: a drying chamber in the shape of a frustum of a cone, a concrete stave silo, an opening in the upper part of said silo, means for suspending said frustum in said silo, large circumference up, an inlet tangent to the lower circumference of said frustum, an outlet tangent to the upper circumference of said frustum, means for producing a gas current through said opening, past the outside of said frustum, into said inlet, helically through said frustum, out said outlet, means for entraining particles of alfalfa on said gas current, and a source of heat in the bottom of said silo for heating said gas current.

6. Apparatus according to claim 5 wherein said source of heat consists of an oil burner, and means for entraining hot combustion gases from said burner in said gas current.

7. Apparatus according to claim 1, wherein a slide gate is placed in said lower duct for controlling the velocity of said heated air entering said frustum through said lower duct.

References Cited in the file of this patent

UNITED STATES PATENTS

| Number | Name | Date |
|---|---|---|
| 748,894 | Trump | Jan. 5, 1904 |
| 1,914,895 | Peebles | June 20, 1933 |
| 2,054,441 | Peebles | Sept. 15, 1936 |
| 2,069,873 | Chenault | Feb. 9, 1937 |
| 2,262,186 | Lindberg | Nov. 11, 1941 |
| 2,316,207 | Winter | Apr. 13, 1943 |
| 2,363,281 | Arnold | Nov. 21, 1944 |
| 2,368,699 | Arnold | Feb. 6, 1945 |

FOREIGN PATENTS

| Number | Country | Date |
|---|---|---|
| 588,688 | Germany | Nov. 23, 1933 |